A. HOUGEN.
GRASS CUTTER.
APPLICATION FILED JAN. 18, 1913.

1,115,314.

Patented Oct. 27, 1914.

Witnesses
M. A. Slyfer
D. W. Gould

Inventor
Albert Hougen

By Victor J. Evans
Attorney

UNITED STATES PATENT OFFICE.

ALBERT HOUGEN, OF MANITOWOC, WISCONSIN.

GRASS-CUTTER.

1,115,314.      Specification of Letters Patent.      Patented Oct. 27, 1914.

Application filed January 18, 1913. Serial No. 742,825.

*To all whom it may concern:*

Be it known that I, ALBERT HOUGEN, a citizen of the United States, residing at Manitowoc, in the county of Manitowoc and State of Wisconsin, have invented new and useful Improvements in Grass-Cutters, of which the following is a specification.

This invention relates to an improved grass cutter designed particularly for the convenient trimming of the grass immediately adjacent fences, buildings or the like and ordinarily out of the reach of the ordinary lawn mower.

The main object of the invention is the provision of a simple type of grass cutter made up of few parts in which the cutting is a positive shearing action and the movable cutter operating at a speed determined by the travel of the implement over the surface.

The invention in its preferred form of details will be described in the following specification, reference being had to the accompanying drawings, in which:—

Figure 1:
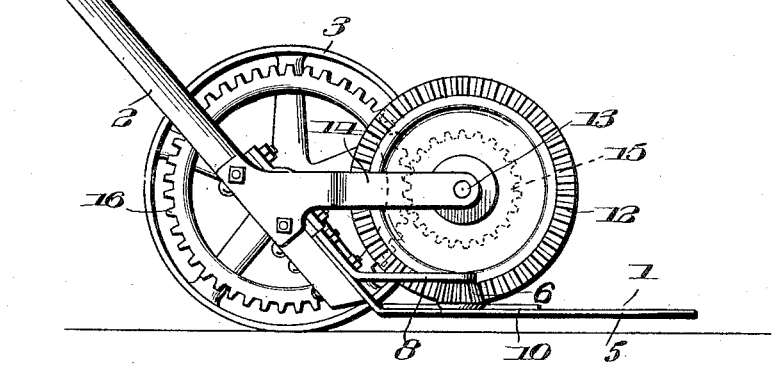
Figure 2:
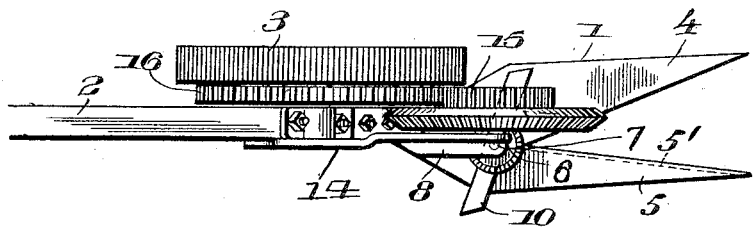
Figure 3:
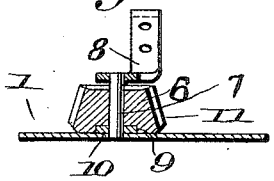
Figure 4:
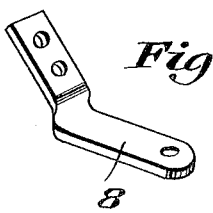

Figure 1 is a perspective view of the improved lawn mower. Fig. 2 is a plan view of the same. Fig. 3 is a section of the blade wheel. Fig. 4 is a detail perspective view showig the brace.

Referring particularly to the accompanying drawings, the improved lawn mower comprises what may be termed a blade member 1 which is at one end appropriately formed to be secured to a handle section 2, the blade member and handle section being disposed at an angle to each other so that when the blade section is in contact or parallelism with the surface to be operated upon the handle section 2 projects therefrom at a convenient angle of the device to be operated. The device is supported upon a ground wheel 3 mounted at an appropriate point in the handle member so that practically any spacing of the blade member from the ground may be secured as desired in accordance with the length of cut to be made. The blade member is formed with a V-shaped recess from its extreme forward edge dividing said member into a guard 4 and a shearing member 5, the edge of the shearing member next the guard being formed in the usual way for a shearing action. Mounted upon the blade member adjacent the juncture of the guard and shearing member is a blade-carrying wheel 6 having its shaft or pivot 7 secured in a brace 8 and in the blade member, the brace overlying the blade member and being spaced therefrom for the greater portion of the length of the same. The relatively inner side, or that surface of the wheel 6 next the blade 5 is provided with a diametrically extending recess 9 in which is seated a blade 10, said blade being in the form of a bar having one or both edges thereof sharpened for coöperation with the shearing edge of the blade 5. The blade 10 is set for projection beyond the circumferential edge of the carrying wheel, and is of course held in close proximity to the upper surface of the blade member so that when the edges of the blade bar 10 pass over the shearing edge of the blade member 5, a shearing coöperation is secured which will effectively cut the grass within reach of the blade bar 10 and between the blade member and guard. The wheel 7 is in the form of a beveled pinion, that has its peripheral surface formed with teeth 11 to provide a gear which is designed to engage with and be operated by a beveled gear 12 set at right angles to the pinion 7 and supported on a shaft 13 mounted in an arm 14 projecting from a handle 2. The gear 12 is of a diameter greatly exceeding the diameter of the pinion 7 whereby comparatively slow movement of the gear 12 imparts an extremely rapid movement to the pinion 7 as is desirable in devices of this character. The face of the gear 12 in the side opposite its coöperation with the pinion 7 is formed or provided with a gear 15 arranged to coöperate with the gear 16 carried by the ground wheel, the gear 16 materially exceeding the diameter of the gear 15 so that in the operation of the device a comparatively slow movement of the wheel induces accelerated movement of the blade 10.

It will be understood that the respective gear connections form a conventional gearing between the ground wheel and blade and as described are merely illustrative of one form of such structure.

In operation the rapid rotation of the blade 10 over the shearing edge of the cutter 5 will readily sever the grass or other vegetation directed into the space between the blade and guard.

What is claimed is:—

A grass trimmer adapted to be moved over the surface of the ground and including a blade member providing a shearing edge and a guard adjacent thereto, a pinion formed with a diametric channel in its lower surface, shaft pin on which the pinion is rotatably mounted, said pin extending through the blade member adjacent the shearing edge, a blade mounted in the channel of the pinion and secured to the shaft pin, a ground wheel, and a geared connection between said pinion and ground wheel to drive the pinion in the movement of the trimmer over the surface being operated upon.

In testimony whereof I affix my signature in presence of two witnesses.

ALBERT HOUGEN.

Witnesses:
C. E. BRADY,
HILDA HENRIKSON.

Copies of this patent may be obtained for five cents each, by addressing the "Commissioner of Patents, Washington, D. C."